Nov. 15, 1955    W. HAND    2,724,087
TESTING APPARATUS
Filed April 2, 1952
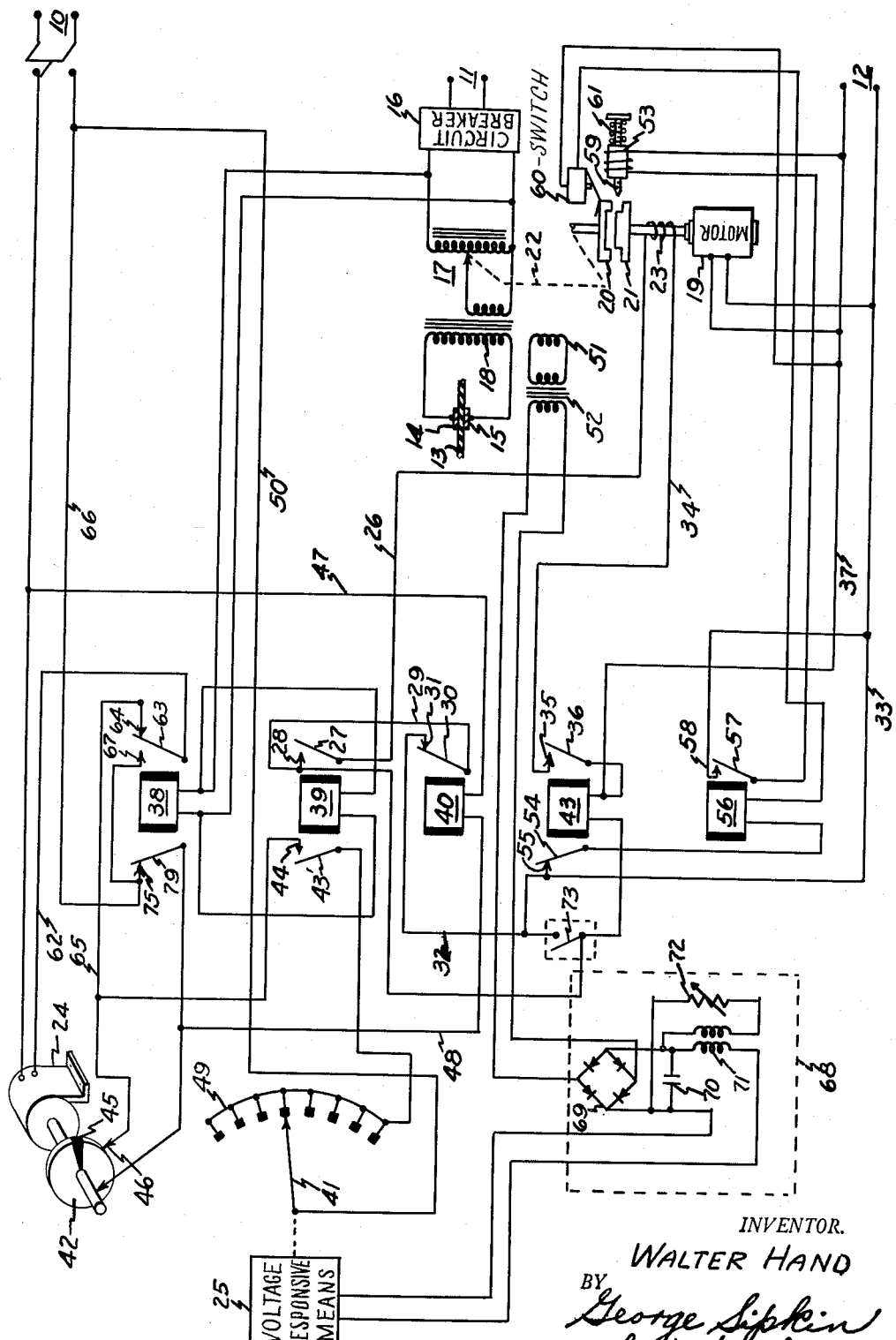
INVENTOR.
WALTER HAND
BY
George Sipkin
Lee J. Huntzberger

United States Patent Office 2,724,087
Patented Nov. 15, 1955

2,724,087
TESTING APPARATUS
Walter Hand, Brooklyn, N. Y.
Application April 2, 1952, Serial No. 280,155
8 Claims. (Cl. 324—54)
(Granted under Title 35, U. S. Code (1952), sec. 266)

The invention described herein may be manufactured and used by or for the Government of the United States of America for governmental purposes without the payment of any royalties thereon or therefor.

This invention relates to an automatic testing apparatus for ascertaining physical properties of specimens. For illustrative purposes, the invention is described with reference to an apparatus for testing the dielectric strength of specimens of insulation material according to a predetermined schedule.

Previous to this invention, it was customary to conduct tests on dielectric specimens by manually controlling and recording all the steps and results. Examples of the two kinds of tests generally conducted are the short-time test and the step-by-step test. In the short-time test, a specimen of an insulating material is inserted between two electrodes and then starting at zero, the testing voltage is increased uniformly to breakdown at a rate of 500 volts per second or a lesser rate if breakdown occurs too soon. In the step-by-step test, an initial voltage is applied equal to 40 percent of the breakdown voltage in the short-time test. The voltage is then increased in increments as indicated in the schedule below, up to failure, and is held at each step for one minute. The change from one step to the next higher is made within 10 seconds.

| Breakdown by short-time test, Kilovolts | Increment of increase for step-by-step, Kilovolts |
|---|---|
| 12.5 or less | .5 |
| 12.5–25 | 1.0 |
| 25–50 | 2.5 |

In order to perform these tests manually, at least two men are needed. When the specimen is in position, one man reads the meter while another varies the test voltage. After a short time, the men become fatigued rendering the results very inaccurate. Furthermore, the man varying the voltage cannot do so at a constant uniform rate as required by the schedule. Hence it is evident that this manual method is unsatisfactory.

An object of this invention is to provide an accurate inexpensive means for testing one of the breakdown properties of materials.

Another object of this invention is to provide an automatic testing device to determine how much change of a particular condition a specimen will stand before failure. The testing means employed for this purpose embodies a timing control element, a measuring instrument including control contacts spaced according to a predetermined schedule so that the change of condition is applied in predetermined steps, and an element responsive to failure of the specimen for stopping the test.

Another object of this invention is to provide a device which facilitates accurate dielectric testing of specimens of insulation material.

Another object of this invention is to provide automatic control means for a power driven autotransformer for increasing the transformer output voltage at a uniform rate, step-by-step, as required by a predetermined schedule.

A further object of this invention is the provision of a positive quick-acting means for quickly disengaging a pair of clutch elements from one another.

An additional object of this invention is to provide a means for reducing the lag of a voltage measuring instrument to the voltage being measured.

Other objects and many attendant advantages of this invention will be readily appreciated as the same becomes better understood by reference to the following detailed description when considered in connection with the accompanying drawing wherein:

The single figure discloses a wiring diagram of an apparatus for testing dielectric specimens.

On the right side of the figure is shown a dielectric specimen 13, located between a pair of electrodes 14 and 15 which are connected to a variable voltage source. The electrodes may be located in any suitable environment such as an oil bath, depending upon the range of voltage to be applied to the dielectric specimen. The variable voltage source comprises a power supply 11 of preferably 110 or 220 volts 60 cycle A. C. Connected to the power supply 11 is an over-current circuit breaker 16. A variable autotransformer 17 is connected to the circuit breaker. The voltage picked off the autotransformer is stepped up by a fixed ratio transformer 18 and applied to the specimen. Upon rupture or sufficient partial breakdown of the specimen, the current drawn will be of sufficient magnitude to cause the circuit breaker to open thereby disconnecting the power supply 11 from the specimen. Any suitable autotransformer may be used and it can have either a rotatable or reciprocable operating member for varying its output voltage.

A constant speed motor 19 connected directly to a D. C. power source 12 is arranged for mechanically driving the operating member 22 of the autotransformer 17. The motor 19 is coupled to the autotransformer operating member 22 by means of a suitable clutch 20, 21. If desired a transmission gear box, not shown, may be added between the motor and clutch for the purpose of providing a mutli-speed drive to the operating member 22 of the autotransformer 17 whereby different rates of voltage rise may be applied to the specimen. Whenever the clutch 20, 21 couples the motor 19 to the operating member 22 of the autotransformer 17, the latter is moved at a constant rate until the clutch members 20, 21 are again disengaged.

The clutch members 20, 21 herein shown are engaged magnetically. This is done either by arranging one of the clutch plates 20 to function as the armature of an electromagnet or by connecting the other clutch plate 21 to a suitable movable magnetic core of the coil 23. In either case, when the coil 23 is energized, the clutch plates engage. Therefore, automatically controlling the energization and deenergization of coil 23 will automatically control the amount of voltage rise supplied to the dielectric specimen.

Broadly, three devices are arranged to control the condition of coil 23, namely, a timing means 24, a voltage responsive means 25, and the aforementioned circuit breaker 16.

The coil 23 is adapted to be energized by D. C. power supply 12 by means of a lead 26 connected to a contactor 27 which cooperates with a stationary contact 28 in circuit with lead 29 which connects with contactor 30 and its cooperating contact 31 which connects with lines 32, 33 to one side of D. C. supply 12. The other side of the coil is connected to contact 35 by means of lead 34, the contact cooperating with contactor 36 which is connected to the other side of the D. C. supply by means of lead 37. Hence there are three possible discontinuities arranged in the energization circuit of coil 23, each of the discontinuities occurring when each of the respective contactors 27, 30, and 36 move to open circuit position.

The position of contactor 27 is dependent upon the condition of circuit breaker 16. When the circuit breaker 16 is closed, relays 38 and 39 are energized, the coils of each relay being connected in parallel with one another across the circuit breaker 16. This portion of the description will be limited to relay 39. Relay 39 is instantly deenergized when the circuit breaker opens permitting contactor 27 to move away from contact 28 to immediately break the circuit continuity to coil 23. Therefore upon failure of the specimen 13, heavy current flow causes the circuit breaker to open deenergizing relay 39 which opens the circuit to coil 23 as set forth above. The autotransformer operating member 22 is thereby uncoupled from the drive motor 19.

The position of contactor 30 is dependent upon the condition of relay 40. Contactor 30 engages its mating contact 31 when relay 40 is deenergized. The energization of relay 40 is controlled by three elements, each of which must be in circuit closing position. The three elements are the pointer 41, the timing disc 42 and the contactor 43'. Contactor 43' remains engaged with contact 44 for so long as the circuit breaker 16 is closed. The operation of the voltage responsive instrument 25 and the timing device 24, 42 will be subsequently described. However, it will be noted that relay 40 will be energized and deenergized cyclically in accordance with the schedule set by the timing device 24, 42 and the voltage responsive instrument 25. Contactor 30 is thereby moved to open and closed position according to a predetermined cyclic schedule.

The third contactor 36 in the circuit of coil 23 follows the position of contactor 30, being in open position when 30 is in open position and being in closed position when 30 is in closed position. In step-by-step operation, contactor 36 duplicates the action of contactor 30. The reason for this is that relay 43 is energized and deenergized in accordance with the position of contactor 30 during step-by-step operation. The utility of contactor 36 will be more clearly understood when the short-run operation is described.

Since contactor 27 remains in closed position till breakdown of the specimen, contactor 36 is opened and closed in accordance with the open and closed position of contactor 30. Therefore, the controls for relay 40 determine the cyclic energization and deenergization of coil 23. The timing disc 42 opens the circuit to relay 40 once every revolution by means of an insulating insert 45 which comes under the cooperating brush 46. The disc shown could equally well be a cam cooperating with the button of a snap switch.

The relay 40 is arranged to be energized by supply 10 being connected to one side of supply 10 by means of a lead 47. It is connected to the other side of supply 10 by means of a lead 48 conductively engaging the shaft carrying disc 42. The disc 42, electrically connected to its shaft is in conductive relationship with the brush 46 for most of a rotation. Brush 46 is connected to contact 44; contactor 43' which is adapted to engage contact 44 is in series with contacts 49 which cooperate with pointer 41. The pointer 41 is connected to the other side of supply 10 through lead 50.

When the circuit to relay 40 is broken by the timing disc, a cycle is initiated. The relay 40 is deenergized permitting contactor 30 to move to closed position. Contactor 36 follows as previously described. The circuit to coil 23 is thereby energized. The clutch members 20, 21 engage under electromagnetic action. The autotransformer 17, coupled to the motor 19, increases the voltage across the specimen 13 at a uniform rate. The voltage across the specimen is monitored by an auxiliary coil 51 through transformer 52 to instrument 25. The instrument pointer 41 thereby follows the voltage variations across the specimen 13.

As the voltage across a specimen rises, the pointer 41 moves off one of the series of contacts 49 and moves toward the next one. The contacts are arranged according to predetermined voltage increments. As the timing disc 42 rotates into conductive relationship with the brush 46, the pointer 41 approaches and then engages the next contact 49. With both the disc 42 and pointer 41 in circuit closing position, relay 40 is again energized, moving contactor 30 to open circuit position. The clutch coil 23 is deenergized whereby the motor 19 is uncoupled from the autotransformer 17 and the voltage rise across the specimen 13 is halted. It is important for proper operation that the timing disc proceed into circuit closing position before the pointer 41 engages the next contact step. If the device is not so designed, the voltage across the specimen may rise two steps at a time since the voltage across the specimen continues to rise so long as the disc 42 remains in open circuit position. Instrument 25 may be any ordinary type voltmeter with or without a recorder, the contacts 49 being added adjacent the instrument scale.

Auxiliary heavy duty solenoid means 53 is provided to positively and quickly separate the clutch members as the next voltage step is applied to the specimen 13. For this purpose, each of the clutch members is provided with a beveled edge at their mating surfaces. When relay 40 is energized upon reaching a desired voltage step, contactor 30 is moved to open position, deenergizing relay 43. As soon as relay 43 is deenergized, contactor 54 engages contact 55. The circuit through relay 56 is then closed through the D. C. supply through contactor 54 and contact 55 which is connected to the D. C. supply through lead 33. Switch 60 which is in the energization circuit of relay 56 is normally closed. When relay 56 is energized, contactor 57 is moved into engagement with contact 58 thereby putting solenoid coil 53 across the supply 12. The core 59 of solenoid 53 has a conical end which is adapted to assume either an extended or retracted position. When in extended position the end enters between the clutch members moving 20 away from 21. Member 20 upon moving to disengaged position opens switch 60 thereby deenergizing relay 56 which in turn deenergizes coil 53. A spring 61 returns the core 59 to retracted position. To avoid eccentric loading two or more equally spaced solenoids may be used.

Relay 38 controls the timing motor circuit. Relay 38 is deenergized when circuit breaker 16 is open. When the relay is deenergized, the circuit to the timing motor is completed from one side of the supply 10 to the motor 24 through lead 62 and from there to contactor 63 and contact 64 which is connected to lead 65 and brush 46. Disc 42 is in rubbing engagement with brush 46 and continues the circuit on to the other side of the supply through contactor 74, contact 75 and lead 66. The motor rotates under this condition until the insulation insert 45 comes under brush 46. Whenever a specimen 13 ruptures and the relay 38 is deenergized, the timer motor continues to rotate until the disc 42 is in starting position for the next test run. When the relay 38 is energized, the circuit to the timer motor is completed through contactor 63 connected to contact 67 which is in circuit with lead 66 and the supply 10. The timer rotates continuously when relay 38 is energized.

If a D. C. instrument having a slow response characteristic or one embodying a continuous balance potentiometer is used at 25, auxiliary circuit means 68 are employed to reduce the lag in the response of the meter. The output of transformer 52 is put through a full wave rectifier 69. Condenser 70 reduces the pulsations. The D. C. input to the instrument is proportional to the A. C. output of transformer 52. A transformer 71 is employed to add a voltage to the instrument input which is proportional to the rate of rise of voltage across the specimen. As soon as the rise in voltage becomes zero, the effect of transformer 71 is zero. Rheostat 72 controls the degree of extra "push" to be supplied by the transformer 71.

For a short-run test, switch 73 is closed. When switch 73 is closed, relay 43 is directly across supply 12. Relay 39 remains energized for so long as circuit breaker 16 is closed. The clutch remains engaged whereby the voltage across the specimen continues to rise. When the specimen ruptures, circuit breaker 16 opens, relay 39 is deenergized, the circuit to coil 23 is opened and the clutch becomes disengaged, thereby terminating the short-run test.

Other examples of uses to which the teachings set forth above may be applied are in tests and apparatus used therefor, for determining the tensile and compressive strengths of materials.

Obviously many modifications and variations of the present invention are possible in the light of the above teachings. It is therefore to be understood that within the scope of the appended claims the invention may be practiced otherwise than as specifically described.

I claim:

1. An apparatus for automatically testing the dielectric strength of a specimen of an insulating material comprising, an adjustable voltage source for connection across the test specimen, said voltage source having a movable part for adjusting the voltage, motor means for moving said part, coupling means for coupling the motor means to said movable part of the voltage source at predetermined times, and means for controlling the condition of said coupling means according to a prearranged schedule, said last-named means comprising timing means for controlling the duration of coupling, and voltage-responsive means to control the coupling action in accordance with a predetermined schedule of voltage steps.

2. Apparatus for automatically testing the dielectric strength of a specimen of an insulating material, said apparatus comprising; a variable transformer; a circuit breaker connected to said variable transformer and adapted to connect said variable transformer across an alternating power supply; said transformer having a rotatable shaft to vary the output voltage of said transformer whereby there is adapted to be applied by said transformer a variable voltage across a test specimen; motor means for rotating the shaft of said variable transformer at a predetermined constant rate; magnetically controllable clutch plates; one of said clutch plates connected to the shaft of said variable transformer and the other said clutch plates connected to said motor means; magnetic field generating means supported adjacent one of said clutch plates and when energized causing said clutch plates to be coupled and when deenergized permitting said clutch plates to be uncoupled for coupling and uncoupling said motor means from the shaft of said transformer; means for controlling the energization and deenergization of said magnetic field generating means according to a prearranged schedule, thereby increasing the voltage for application to a specimen, in predetermined voltage steps, and for holding at each voltage step for a predetermined length of time, the sequence of voltage steps continuing until a specimen across which the voltage of said transformer is applied is ruptured and said circuit breaker opens, said means for controlling the energization and deenergization of said magnetic field generating means including a voltage responsive instrument, having a contactor element adapted to assume a position along a path in accordance with each instant value of voltage applied across a specimen, said voltage responsive instrument further having contacts spaced along the path of the contactor element to be contacted singly by the contactor element, the spacing of contacts corresponding to steps of voltage in the aforementioned schedule, a timer-controlled switch connected in series-circuit with said contacts and adapted to control the time interval each voltage step is held, relay-switch means connected in circuit with said timer-controlled switch, said voltage sensitive element, said circuit breaker, and said magnetic field generating means, to control the time interval each voltage step is maintained and to initiate or terminate a cycle of voltage increase, a booster transformer connected in circuit with said voltage responsive instrument and adapted for connection across a test specimen for supplying an additional voltage to said voltage responsive instrument proportional to the rate of change of voltage across a specimen so that the contactor of said voltage responsive instrument follows substantially exactly the voltage rise across a specimen, said last-mentioned transformer having a primary winding adapted to be energized by the voltage across a specimen, and further having a secondary winding connected in series with said voltage responsive instrument to introduce into said voltage responsive instrument a voltage component proportional to the rate of change of test voltage across a specimen, said booster transformer having no effect when rate of voltage change is zero; a solenoid having a core with a wedge-shaped end portion, supported immediately adjacent said clutch plates, the wedge-shaped end portion of said solenoid core being adapted for movement to extended position between said clutch plates to separate said clutch plates when said solenoid is energized and being adapted for movement into retracted position from between said clutch plates when said solenoid is deenergized whereby said solenoid is operative to provide a disengaging force to the clutch plates at the instant said magnetic field generating means is deenergized; means connecting said solenoid in circuit with said relay-switch means; and switch means connected in circuit with said relay-switch means for converting the apparatus to short run continuous use whereby voltage applied across a specimen rises at a continuous rate until the specimen fails instead of rising in a step-by-step fashion until the specimen fails.

3. Apparatus for automatically testing the dielectric strength of a specimen of an insulating material, said apparatus comprising; a variable transformer; a circuit breaker connected to said variable transformer and adapted to connect said variable transformer across an alternating power supply; said transformer having a rotatable shaft to vary the output voltage of said transformer whereby there is adapted to be applied by said transformer a variable voltage across a test specimen; motor means for rotating the shaft of said variable transformer at a predetermined constant rate; magnetically controllable clutch plates; one of said clutch plates connected to the shaft of said variable transformer and the other said clutch plates connected to said motor means; magnetic field generating means supported adjacent one of said clutch plates and when energized causing said clutch plates to be coupled and when deenergized permitting said clutch plates to be uncoupled for coupling and uncoupling said motor means from the shaft of said transformer; means for controlling the energization and deenergization of said magnetic field generating means according to a prearranged schedule, thereby increasing the voltage for application to a specimen, in predetermined voltage steps, and for holding at each voltage step for a predetermined length of time, the sequence of voltage steps continuing until a specimen across which the voltage of said transformer is applied is ruptured and said circuit breaker opens, said means for controlling the energization and deenergization of said magnetic field generating means including a voltage responsive instrument, having a contactor element adapted to assume a position along a path in accordance with each instant value of voltage applied across a specimen, said voltage responsive instrument further having contacts spaced along the path of the contactor element to be contacted singly by the contactor element, the spacing of contacts corresponding to steps of voltage in the aforementioned schedule, a timer-controlled switch connected in series-circuit with said contacts and adapted to control the time interval each voltage step is held, relay-switch means connected in circuit with said timer-controlled switch, said voltage sensitive element, said circuit breaker, and said magnetic field generating means, to control the time interval each voltage step is maintained and to initiate or terminate a cycle of voltage increase, a booster transformer connected in circuit with said voltage responsive instrument and adapted for connection across a test specimen for supplying an additional voltage to said voltage responsive instrument proportional to the rate of change of voltage across a specimen so that the contactor of said voltage responsive instrument follows substantially exactly the voltage rise across a specimen, said last-mentioned transformer having a primary winding adapted to be energized by the voltage across a specimen, and further having a secondary winding connected in series with said voltage responsive instrument to introduce into said voltage responsive instrument a voltage component proportional to the rate of change of test voltage across a specimen, said booster transformer having no effect when rate of voltage change is zero; a solenoid having a core with a wedge-shaped end portion, supported immediately adjacent said clutch plates, the wedge-shaped end portion of said solenoid core being adapted for movement to extended position between said clutch plates to separate said clutch plates when said solenoid is energized and being adapted for movement into retracted position from between said clutch plates when said solenoid is deenergized whereby said solenoid is operative to provide a disengaging force to the clutch plates at the instant said magnetic field generating means is deenergized; and means connecting said solenoid in circuit with said relay-switch means.

4. Apparatus for automatically testing the dielectric strength of a specimen of an insulating material, said apparatus comprising; a variable transformer; a circuit breaker connected to said variable transformer and adapted to connect said variable transformer across an alternating power supply; said transformer having a rotatable shaft to vary the output voltage of said transformer whereby there is adapted to be applied by said transformer a variable voltage across a test specimen; motor means for rotating the shaft of said variable transformer at a predetermined constant rate; magnetically controllable clutch plates; one of said clutch plates connected to the shaft of said variable transformer and the other said clutch plates connected to said motor means; magnetic field generating means supported adjacent one of said clutch plates and when energized causing said clutch plates to be coupled and when deenergized permitting said clutch plates to be uncoupled for coupling and uncoupling said motor means from the shaft of said transformer; means for controlling the energization and deenergization of said magnetic field generating means according to a prearranged schedule, thereby increasing the voltage for application to a specimen, in predetermined voltage steps, and for holding at each voltage step for a predetermined length of time, the sequence of voltage steps continuing until a specimen across which the voltage of said transformer is applied is ruptured and said circuit breaker opens, said means for controlling the energization and deenergization of said magnetic field generating means including a voltage responsive instrument, having a contactor element adapted to assume a position along a path in accordance with each instant value of voltage applied across a specimen, said voltage responsive instrument further having contacts spaced along the path of the contactor element to be contacted singly by the contactor element, the spacing of contacts corresponding to steps of voltage in the aforementioned schedule, a timer-controlled switch connected in series-circuit with said contacts and adapted to control the time interval each voltage step is held, relay-switch means connected in circuit with said timer-controlled switch, said voltage sensitive element, said circuit breaker, and said magnetic field generating means, to control the time interval each voltage step is maintained and to initiate or terminate a cycle of voltage increase, a booster transformer connected in circuit with said voltage responsive instrument and adapted for connection across a test specimen for supplying an additional voltage to said voltage responsive instrument proportional to the rate of change of voltage across a specimen so that the contactor of said voltage responsive instrument follows substantially exactly the voltage rise across a specimen, said last-mentioned transformer having a primary winding adapted to be energized by the voltage across a specimen, and further having a secondary winding connected in series with said voltage responsive instrument to introduce into said voltage responsive instrument a voltage component proportional to the rate of change of test voltage across a specimen, said booster transformer having no effect when rate of voltage change is zero.

5. Apparatus for automatically testing the dielectric strength of a specimen of an insulating material, said apparatus comprising; a variable transformer; a circuit breaker connected to said variable transformer and adapted to connect said variable transformer across an alternating power supply; said transformer having a rotatable shaft to vary the output voltage of said transformer whereby there is adapted to be applied by said transformer a variable voltage across a test specimen; motor means for rotating the shaft of said variable transformer at a predetermined constant rate; magnetically controllable clutch plates; one of said clutch plates connected to the shaft of said variable transformer and the other said clutch plates connected to said motor means; magnetic field generating means supported adjacent one of said clutch plates and when energized causing said clutch plates to be coupled and when deenergized permitting said clutch plates to be uncoupled for coupling and uncoupling said motor means from the shaft of said transformer; means for controlling the energization and deenergization of said magnetic field generating means according to a prearranged schedule, thereby increasing the voltage for application to a specimen, in predetermined voltage steps, and for holding at each voltage step for a predetermined length of time, the sequence of voltage steps continuing until a specimen across which the voltage of said transformer is applied is ruptured and said circuit breaker opens, said means for controlling the energization and deenergization of said magnetic field generating means including a voltage responsive instrument, having a contactor element adapted to assume a position along a path in accordance with each instant value of voltage applied across a specimen, said voltage responsive instrument further having contacts spaced along the path of the contactor element to be contacted singly by the contactor element, the spacing of contacts corresponding to steps of voltage in the aforementioned schedule, a timer-controlled switch connected in series-circuit with said contact and adapted to control the time interval each voltage step is held, relay-switch means connected in circuit with said timer-controlled switch, said voltage sensitive element, said circuit breaker, and said magnetic field generating means, to control the time interval each voltage step is maintained and to initiate or terminate a cycle of voltage increase, a booster transformer connected in circuit with said voltage responsive instrument and adapted for connection across a test specimen for supplying an additional voltage to said voltage responsive instrument proportional to the rate of change of voltage across a specimen so that the contactor of said voltage responsive instrument follows substantially exactly the voltage rise across a specimen, said last-mentioned transformer having a primary winding adapted to be energized by the voltage across a specimen, and further having a secondary winding connected in series with said voltage responsive instrument to introduce into said voltage responsive instrument a voltage component proportional to the rate of change of test voltage across a specimen, said booster transformer having no effect when rate of voltage change is zero; and switch means connected in circuit with said relay-switch means for converting the apparatus to short run continuous use whereby voltage applied across a specimen rises at a continuous rate until the specimen fails instead of rising in a step-by-step fashion until the specimen fails.

6. Apparatus for automatically testing the dielectric strength of a specimen of an insulating material, said apparatus comprising; a variable transformer; a circuit breaker connected to said variable transformer and adapted to connect said variable transformer across an alternating power supply; said transformer having a rotatable shaft to vary the output voltage of said transformer whereby there is adapted to be applied by said transformer a variable voltage across a test specimen; motor means for rotating the shaft of said variable transformer at a predetermined constant rate; magnetically controllable clutch plates; one of said clutch plates connected to the shaft of said variable transformer and the other said clutch plates connected to said motor means; magnetic field generating means supported adjacent one of said clutch plates and when energized causing said clutch plates to be coupled and when deenergized permitting said clutch plates to be uncoupled for coupling and uncoupling said motor means from the shaft of said transformer; means for controlling the energization and deenergization of said magnetic field generating means according to a prearranged schedule, thereby increasing the voltage for application to a specimen, in predetermined voltage steps, and for holding at each voltage step for a predetermined length of time, the sequence of voltage steps continuing until a specimen across which the voltage of said transformer is applied is ruptured and said circuit breaker opens, said means for controlling the energization and deenergization of said magnetic field generating means including a voltage responsive instrument adapted for connection in circuit with the specimen and having a contactor element adapted to assume a position along a path in accordance with each instant value of voltage applied across a specimen, said voltage responsive instrument further having contacts spaced along the path of the contactor element to be contacted singly by the contactor element, the spacing of contacts corresponding to steps of voltage in the aforementioned schedule, a timer-controlled switch connected in series-circuit with said contacts and adapted to control the time interval each voltage step is held, relay-switch means connected in circuit with said timer-controlled switch, said voltage sensitive element, said circuit breaker, and said magnetic field generating means, to control the time interval each voltage step is maintained and to initiate or terminate a cycle of voltage increase.

7. Apparatus for automatically testing the dielectric strength of a specimen of an insulating material, said apparatus comprising; a variable transformer; a circuit breaker connected to said variable transformer and adapted to connect said variable transformer across an alternating power supply; said transformer having a rotatable shaft to vary the output voltage of said transformer whereby there is adapted to be applied by said transformer a variable voltage across a test specimen; motor means for rotating the shaft of said variable transformer at a predetermined constant rate; magnetically controllable clutch means connected between the shaft of said variable transformer and said motor means; magnetic field generating means supported adjacent said clutch means and when energized causing said clutch means to couple the shaft of said variable transformer to said motor means and when deenergized, decoupling the shaft of said variable transformer and said motor means; means for controlling the energization and deenergization of said magnetic field generating means according to a prearranged schedule, thereby increasing the voltage for application to a specimen, in predetermined voltage steps, and for holding at each voltage step for a predetermined length of time, the sequence of voltage steps continuing until a specimen across which the voltage of said transformer is applied is ruptured and said circuit breaker opens, said means for controlling the energization and deenergization of said magnetic field generating means including a voltage responsive instrument adapted for connection in circuit with a specimen, and having a contactor element adapted to assume a position along a path in accordance with each instant value of voltage applied across a specimen, said voltage responsive instrument further having contacts spaced along the path of the contactor element to be contacted singly by the contactor element, the spacing of contacts corresponding to steps of voltage in the aforementioned schedule, a timer-controlled switch connected in series-circuit with said contacts and adapted to control the time interval each voltage step is held, and relay-switch means connected in circuit with said timer-controlled switch, said voltage sensitive element, said circuit breaker, and said magnetic field generating means, to control the time interval each voltage step is maintained and to initiate or terminate a cycle of voltage increase.

8. Apparatus for automatically testing the dielectric strength of a specimen of an insulating material, said apparatus comprising; a variable transformer; a circuit breaker connected to said variable transformer and adapted to connect said variable transformer across an alternating power supply; said transformer having a movable element to vary the output voltage of said transformer whereby there is adapted to be applied by said transformer a variable voltage across a test specimen; motor means for moving the movable element of said variable transformer at a predetermined constant rate; magnetically controllable clutch means connected between the movable element of said variable transformer and said motor means; magnetic field generating means supported adjacent said clutch means and when energized causing said clutch means to couple the movable element of said variable transformer to said motor means and when deenergized, decoupling the movable element of said variable transformer from said motor means; means for controlling the energization and deenergization of said magnetic field generating means according to a prearranged schedule, thereby increasing the voltage for application to a specimen, in predetermined voltage steps, and for holding at each voltage step for a predetermined length of time, the sequence of voltage steps continuing until a specimen across which the voltage of said transformer is applied is ruptured and said circuit breaker opens, said means for controlling the energization and deenergization of said magnetic field generating means including a voltage responsive instrument adapted for connection in circuit with a specimen, and having a contactor element adapted to assume a position along a path in accordance with each instant value of voltage applied across a specimen, said voltage responsive instrument further having contacts spaced along the path of the contactor element to be contacted singly by the contactor element, the spacing of contacts corresponding to steps of voltage in the aforementioned schedule, a timer-controlled switch connected in series-circuit with said contacts and adapted to control the time interval each voltage step is held and relay-switch means connected in circuit with said timer-controlled switch, said voltage sensitive element, said circuit breaker, and said magnetic field generating means, to control the time interval each voltage step is maintained and to initiate or terminate a cycle of voltage increase.

References Cited in the file of this patent

UNITED STATES PATENTS

| | | |
|---|---|---|
| 1,985,394 | Anderson | Dec. 25, 1934 |
| 2,021,534 | Worgan | Nov. 19, 1935 |
| 2,108,974 | Schott | Feb. 22, 1938 |
| 2,117,894 | Lenham | May 17, 1938 |
| 2,280,766 | Bronaugh | Apr. 21, 1942 |
| 2,310,335 | Wolfson | Feb. 9, 1943 |
| 2,358,480 | Skilling | Sept. 19, 1944 |
| 2,499,720 | Boynton | Mar. 7, 1950 |
| 2,504,017 | George | Apr. 11, 1950 |
| 2,614,152 | Herbon | Oct. 14, 1952 |